Sept. 19, 1967    G. F. MEYER    3,342,501

GASKET

Filed May 13, 1965

INVENTOR.
GEORGE F. MEYER
BY
John N. Wolfram
ATTORNEY

United States Patent Office 3,342,501
Patented Sept. 19, 1967

3,342,501
GASKET
George F. Meyer, Playa Del Rey, Calif., assignor to Parker-Hannifin Corporation, Cleveland, Ohio, a corporation of Ohio
Filed May 13, 1965, Ser. No. 455,410
5 Claims. (Cl. 277—180)

ABSTRACT OF THE DISCLOSURE

A composite gasket in which a pair of opposed non-deformable plates have aligned openings therein, a third non-deformable plate is between the opposed plates and has an opening aligned with the openings in the opposed plates but of larger diameter so as to form a space between the plates surrounding the openings therein, and there is a resilient sealing element within the openings that has a flange extending into the space.

---

This invention relates to gaskets adapted to be clamped between a pair of opposed elements so as to seal the joint therebetween, and more particularly relates to composite gaskets which include a resilient rubberlike portion attached to a portion of metal or other hard material.

In such composite gaskets, the resilient portion is provided for making the seal and the metal portion for confining the resilient portion and for taking the thrust from the members being sealed when the parts are clamped together. Also, it is desirable to attach the rubber to the metal so that the entire sealing member may be handled as one piece. These considerations usually require that the metal portion be machined with a groove for receiving at least a part of the rubber portion. Such machining of grooves in the metal portion is expensive, particularly when the grooves must be of a shape other than round.

The present invention has for an object a construction which eliminates the machining of grooves and in which the metal portion of the gasket may be cheaply made from a multiple of thin metal plates punched to the desired configuration.

It is another object to make the metal portion of the gasket by stacking together at least three thin metal plates, the outer ones of which have one or more similarly contoured openings for receiving rubber sealing elements, and the intermediate plate having a corresponding opening or openings contoured to a different size or pattern so that there will be a space between the outer plates for receiving part of the rubber portion for retaining the rubber sealing element with the plates.

It is another object to provide a gasket constructed of at least three thin metal plates stacked together, with the plates being formed so as to provide a groove or recess into which a part of the rubber member may be formed for anchoring the rubber to the plates, the plates being bonded or welded together to effect a one piece construction, one of the plates also serving to back up the rubber member so as to prevent extrusion thereof by fluid pressure.

It is another object to provide a novel apparatus and method for assembling the plates and molding the rubber portion in place with respect to the plates.

Other objects of the invention will be apparent from the following description and from the drawings in which.

Figure 1:
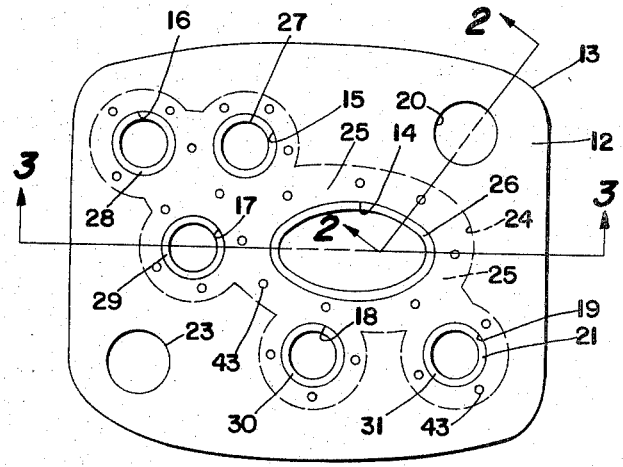
FIG. 1 is a plan view of the composite metal and rubber gasket.

The gasket of the present invention includes plates 10, 11, and 12, of metal or other relatively hard material, which comprises a rigid member generally designated 13. The plates are thin and it is preferable that they be of equal and uniform thickness, although this is not essential. They are formed with one or more seal receiving openings to suit the desired use. Thus in the form of the invention illustrated, plate 12 has a multiple of openings 14, 15, 16, 17, 18 and 19 therethrough for receiving resilient sealing members and also has a pair of openings 20, 23 through which clamping bolts may pass. Plate 10 is formed identical to plate 12. Plate 11 has the same peripheral configuration as plates 10 and 12 but it has a single opening 24 which is shaped as shown by the dotted line in FIG. 1, for surrounding all the individual seal receiving openings in plates 10 and 12. In other configurations, particularly when the openings in plates 10 and 12 are spaced greater lateral distances from each other, plate 11 may be formed with more than one opening, each surrounding one or more of the seal receiving openings in plates 10, 12.

Since opening 24 in plate 11 extends laterally beyond the seal receiving openings in plates 10, 12, there will be a thin space 25 between plates 10 and 12 adjacent the seal receiving openings therethrough. Plates 10 and 12 are preferably bonded to plate 11 as by soldering, welding or by means of an adhesive such as an epoxy resin.

Resilient sealing element 21 has annular sealing portions 26, 27, 28, 29, 30 and 31 that are contained within openings 14, 15, 16, 17, 18 and 19, respectively and that have outer curved faces 33, 34 which initially project beyond the outer end faces of plates 10 and 12 for engaging in sealing contact with corresponding faces 35, 36 on members 37, 38. The resilient sealing element is preferably molded in place by a method and apparatus illustrated and described herein so that resilient material will flow into space 25 around all of the openings containing thick sealing portions to form a flange 39 of resilient material which completely fills the space 25 and is integrally attached to each of the sealing portions 26, 27, 28, 29, 30, and 31. Flange 39 is in contact with the outer wall 24 of space 25 so as to be backed up by center plate 11 to prevent outward extrusion when fluid pressure is acting on the inner surfaces of the sealing portions.

Although in many instances it is not necessary to do so, plates 10 and 12 may be provided with a series of small holes 43, 44 opposite space 25 into which resilient material flows during the molding operation to form a series of small pins or lugs 45, 46 integral with flange 39 for further anchoring sealing element 21 in place with respect to the plates.

Figure 2:
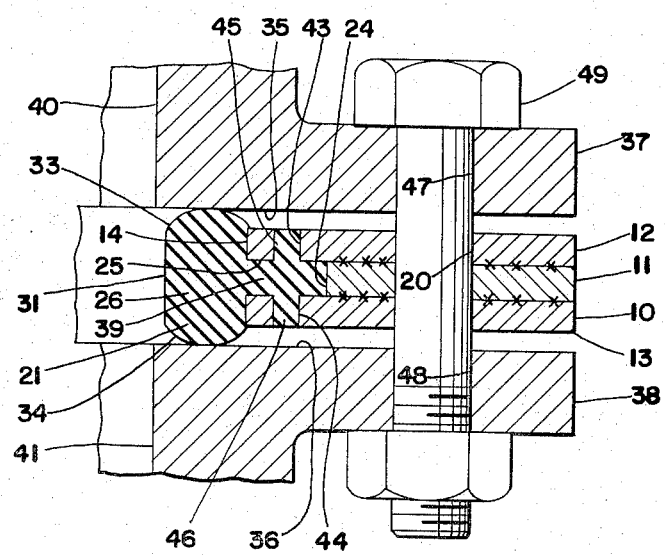
FIG. 2 is an enlarged cross-section of the gasket taken along the lines 2—2 of FIG. 1, as it appears between a pair of elements to be sealed just before clamping pressure is applied.
Figure 3:
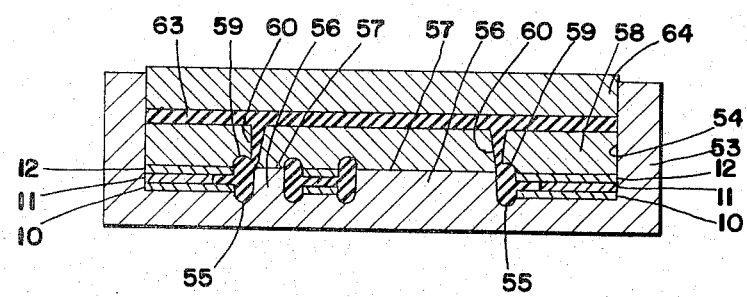
FIG. 3 is a cross-section of an apparatus for molding the rubber portion in place with respect to the stacked plates, the gasket being shown in the mold on a cross-section line corresponding to 3—3 of FIG. 1.

Members 37, 38 may be formed with openings 47, 48 in alignment with holes 20, 23 for receiving bolts 49 for clamping members 37, 38 tightly in place upon gasket 13, and have openings corresponding with the openings through the annular sealing portions 26, 27, 28, 29, 30 and 31, FIG. 2 showing openings 40, 41 in members 37, 38 that correspond with opening 31 in sealing portion 26. As shown in FIG. 2, members 37, 38 have been brought together just enough to establish contact with outer end surfaces 33, 34 of sealing portion 26, and has established similar contact with the end surfaces of sealing members 27, 28, 29, 30 and 31. Bolts 49 may then be tightened to bring surfaces 35, 36 into tight clamping contact with the outer faces of plates 10, 12 at which time all of the sealing portions just mentioned will be deformed so as to be in tight sealing contact with faces 35, 36.

In making gasket 13, plates 10, 11 and 12 are first stamped out to the configuration and with the openings as shown in FIG. 1. The plates are then stacked in proper order within a die member 53 which has a recess with an inner wall 54 conforming generally to the outer configuration of the plates so as to locate the same therein. The bottom of the recess has a series of grooves or indentations 55 corresponding to the outer surfaces, such as 34, of the sealing members to be formed. Die member 53 also has a series of upstanding pins 56 to form the openings within the sealing members and whose upper faces 57 are substantially aligned with the upper face of plate 12.

At the time plates 10, 11, 12 are placed in the mold they have preferably been treated with an epoxy resin on adjoining faces. After the plates have been placed in the mold die member 58, having an outer configuration corresponding to that of recess 54, is placed in the mold as shown. This plates has a series of grooves 59 corresponding to and opposite grooves 55, and it also has sprue openings 60 therethrough leading to grooves 59 but preferably intersecting such grooves at an off-center location so that the central portion of grooves 59 will be a smooth uninterrupted surface. By this means the central portion of projecting face 33 of sealing portion 26, and the corresponding face of the other sealing portions, will likewise be smooth and uninterrupted for good sealing qualities.

A sheet of uncured resilient material 63 is then placed on top of die member 58 and a plunger 64 is inserted. The complete mold assembly is then placed in a molding press and subjected to heat and pressure, the pressure being applied to plunger 64 to force resilient material from uncured sheet 63 through sprues 60 into the molding cavities for forming sealing portions 26, 27, 28, 29, 30 and 31 and the connecting flange 25, as well as anchoring pins 45, 46.

The cross-section configuration of the sealing portions, as shown in FIG. 2 is a preferred form, but it is obvious that this configuration, as well as other details of construction of the plates, sealing portions, molding equipment, and the method of molding, may be varied while still retaining the inventive concepts herein disclosed and covered by the claims.

I claim:

1. A gasket comprising a pair of opposed relatively non-deformable plate members, one of said members having at least one opening therethrough aligned with an opening through the other member, a third relatively non-deformable plate member between said opposed members and having an opening therethrough aligned with but larger than the openings of said opposed members so as to provide a space between said opposed members, a sealing element of resilient material having a sealing portion within said openings and extending axially outwardly beyond at least one of said opposed members, said sealing portion having a flange extending radially outwardly therefrom into said space said plate members being in contact with each other and relatively incompressible in an axial direction.

2. The gasket of claim 11 in which each of said members is in the form of a thin sheet of uniform thickness throughout.

3. The gasket of claim 1 in which said members are bonded together.

4. The gasket of claim 1 in which at least one of said opposed members has an additional opening therethrough in register with said space and said flange has a projection extending into said last mentioned opening.

5. A gasket comprising a pair of opposed relatively non-deformable members having a plurality of laterally spaced aligned openings therethrough, a third relatively non-deformable member between said opposed members and having a single opening therethrough that surrounds said aligned openings and extends laterally beyond the same so as to provide a space between said opposed members that surrounds said plurality of aligned openings, a sealing element of resilient material having a sealing portion within said aligned openings and extending axially outwardly beyond both of said opposed members, said sealing element also having a flange integral therewith and extending laterally into said space to completely fill the same and to completely surround each of said aligned openings.

References Cited

UNITED STATES PATENTS

| | | | |
|---|---|---|---|
| 2,159,825 | 5/1939 | Stevens | 277—231 |
| 2,395,243 | 2/1946 | Aukers | 277—166 |
| 2,681,241 | 6/1954 | Aukers | 277—234 X |
| 2,737,405 | 3/1956 | Shinn | 277—226 |
| 3,195,906 | 7/1965 | Moyers | 277—180 |
| 3,259,404 | 7/1966 | Papenguth | 277—180 X |

SAMUEL ROTHBERG, *Primary Examiner.*